(12) United States Patent
Cameron et al.

(10) Patent No.: US 8,067,479 B2
(45) Date of Patent: Nov. 29, 2011

(54) POLYURETHANE FOAM

(75) Inventors: Paul Cameron, Northallerton (GB); Eric Appelman, Dordrecht (NL)

(73) Assignees: Croda International PLC, Goole, East Yorkshire (GB); Uniqema B.V., Gouda (NL)

( * ) Notice: Subject to any disclaimer, the term of this patent is extended or adjusted under 35 U.S.C. 154(b) by 0 days.

(21) Appl. No.: 12/588,622

(22) Filed: Oct. 21, 2009

(65) Prior Publication Data

US 2010/0112333 A1    May 6, 2010

Related U.S. Application Data

(63) Continuation of application No. 10/505,148, filed as application No. PCT/GB03/00599 on Feb. 10, 2003, now abandoned.

(30) Foreign Application Priority Data

Feb. 19, 2002    (GB) .................................. 0203881.8

(51) Int. Cl.
*C08G 18/10* (2006.01)
(52) U.S. Cl. .................. 521/159; 521/130; 521/172
(58) Field of Classification Search .................. 521/130, 521/159, 172
See application file for complete search history.

(56) References Cited

U.S. PATENT DOCUMENTS

| | | | | |
|---|---|---|---|---|
| 2,904,184 A | * | 9/1959 | Daley et al. ................ | 210/323.2 |
| 3,264,236 A | * | 8/1966 | Santaniello ................... | 525/440 |
| 4,155,899 A | * | 5/1979 | Lemper et al. ................ | 524/533 |
| 4,602,079 A | * | 7/1986 | Vinches et al. ................ | 528/60 |
| 5,840,782 A | * | 11/1998 | Limerkens et al. ........... | 521/174 |

OTHER PUBLICATIONS

Examination Report dated Apr. 26, 2010 for corresponding India Application No. 2180/DELNP/2004.
Britian, J. W. "Behavior of Isocyanate-Terminated Prepolymers in the Presence of Various Catalysts" *I & EC Product Research and Development*, 1:4 (Dec. 1962) 261-264.
Chang, Wen-Hsuan et al. "Advances in Polyurethane Coatings 91969 to Early 1972)" *Ind. Eng. Chem. Prod. Res. Develop.*, 12:4 (1973) 278-288.
Frisch, Kurt C. et al. "Urethane Coatings" *Applied Polymer Science* ($2^{nd}$ Ed.), Chapter 41 (1985) 985- 1029, ACS Symposium Series: American Chemical Society, vol. 285.
Papa, Anthony J. "Reactive Flame Retardants for Polyurethane Foams" *Ind. Eng. Chem. Prod. Res. Develop.*, 9:4 (1970) 478-496.

* cited by examiner

*Primary Examiner* — John Cooney
(74) *Attorney, Agent, or Firm* — Jones Day

(57) ABSTRACT

A microcellular polyurethane obtainable by reacting a polyisocyanate, a polyester formed from a dimer fatty acid and/or dimer fatty diol, and a chain extender. The foam is particularly suitable for use as a component of shoe soles.

16 Claims, No Drawings

POLYURETHANE FOAM

CROSS REFERENCE TO RELATED APPLICATIONS

This application is a continuation of U.S. patent application Ser. No. 10/505,148, filed Jan. 12, 2005 which has now been abandoned, which is further the National Phase of International Application No. PCT/GB2003/000599, filed Feb. 10, 2003, which designated the United States and was published in English. These related applications, in their entirety, are incorporated herein by reference.

FIELD OF INVENTION

The present invention relates to a microcellular polyurethane foam, a process of making the foam, and in particular to the use thereof in shoe soles.

BACKGROUND

Polyurethanes are extremely versatile materials and have been used in a wide variety of applications such as foam insulation, car seats and abrasion resistant coatings. Polyurethanes are used in a wide variety of forms, for example non-cellular materials such as elastomers; and cellular materials such as low density flexible foams, high density flexible foams, and microcellular foams. Microcellular foams have been used for energy absorbing bumper mountings and auxiliary suspension units for wheels, and in particular in shoe soles.

Microcellular polyurethane foams used in shoe soles require a wide range of properties such as resistance and durability in actual use, combined with high flexibility, optimal impact resilience, low weight, high thermal insulation and cushioning. There is a need for microcellular polyurethane foams to provide an improvement in one or more of the aforementioned properties. In particular, known shoe soling materials tend to have insufficient flexibility on repeated flexing at low temperature (due to strain hardening), and hydrolytic instability.

REVIEW OF THE PRIOR ART

EP-0795572-A is directed to the use of a polyester polyol, derived from terephthalic acid and adipic acid, to produce polyurethane foam for shoe soles.

U.S. Pat. No. 5,856,372 is directed to a microcellular polyurethane shoe sole component formed from isocyanate-terminated prepolymers derived from polyoxypropylene diols.

SUMMARY OF THE INVENTION

We have now surprisingly discovered a microcellular polyurethane foam which reduces or substantially overcomes at least one of the aforementioned problems.

Accordingly, the present invention provides a microcellular polyurethane foam obtainable by reacting a polyisocyanate, a polyester formed from a dimer fatty acid and/or dimer fatty diol, and a chain extender.

The invention also provides a process for preparing a microcellular polyurethane foam which comprises (i) reacting a polyisocyanate with a polyester formed from a dimer fatty acid and/or dimer fatty diol, to form an isocyanate-terminated prepolymer, and (ii) reacting the prepolymer with a chain extender.

The invention further provides an isocyanate-terminated prepolymer which is the reaction product of a polyisocyanate and a polyester which is the reaction product of dimer fatty acid, adipic acid and diethylene glycol.

The invention still further provides a shoe sole comprising a microcellular polyurethane foam obtainable by reacting a polyisocyanate, a polyester formed from a dimer fatty acid and/or dimer fatty diol, and a chain extender.

The polyester used in the present invention is formed from, ie comprises the reaction product of, at least one dimer fatty acid and/or dimer fatty diol and/or equivalent thereof. Polyester is normally produced in a condensation reaction between at least one polycarboxylic acid and at least one polyol. Dicarboxylic acids and diols are preferred. The preferred dicarboxylic acid component of the polyester used in the present invention preferably comprises at least one dimer fatty acid.

The term dimer fatty acid is well known in the art and refers to the dimerisation product of mono- or polyunsaturated fatty acids and/or esters thereof. Preferred dimer fatty acids are dimers of $C_{10}$ to $C_{30}$, more preferably $C_{12}$ to $C_{24}$, particularly $C_{14}$ to $C_{22}$, and especially $C_{18}$ alkyl chains. Suitable dimer fatty acids include the dimerisation products of oleic acid, linoleic acid, linolenic acid, palmitoleic acid, and elaidic acid. The dimerisation products of the unsaturated fatty acid mixtures obtained in the hydrolysis of natural fats and oils, e.g. sunflower oil, soybean oil, olive oil, rapeseed oil, cottonseed oil and tall oil, may also be used. Hydrogenated, for example by using a nickel catalyst, dimer fatty acids may also be employed.

In addition to the dimer fatty acids, dimerisation usually results in varying amounts of oligomeric fatty acids (so-called "trimer") and residues of monomeric fatty acids (so-called "monomer"), or esters thereof, being present. The amount of monomer can, for example, be reduced by distillation. Suitable dimer fatty acids have a dicarboxylic (or dimer) content of greater than 60%, preferably greater than 75%, more preferably in the range from 80 to 96%, particularly 85 to 92%, and especially 87 to 89% by weight. The trimer content is suitably less than 40%, preferably in the range from 2 to 25%, more preferably 5 to 15%, particularly 7 to 13%, and especially 9 to 11% by weight. The monomer content is preferably less than 10%, more preferably in the range from 0.2 to 5%, particularly 0.5 to 3%, and especially 1 to 2% by weight. All of the above % by weight values are based on the total weight of trimer, dimer and monomer present.

The dicarboxylic acid component of the polyester preferably also comprises non-dimeric dicarboxylic acids (hereinafter referred to as non-dimeric acids). The non-dimeric acids may be aliphatic or aromatic (such as phthalic acid, isophthalic acid and terephthalic acid), and include dicarboxylic acids and the esters, preferably alkyl esters, thereof, preferably linear dicarboxylic acids having terminal carboxyl groups having a carbon chain in the range from 2 to 20, more preferably 6 to 12 carbon atoms, such as adipic acid, glutaric acid, succinic acid, pimelic acid, suberic acid, azelaic acid, sebacic acid, heptane dicarboxylic acid, octane dicarboxylic acid, nonane dicarboxylic acid, decane dicarboxylic acid, undecane dicarboxylic acid, dodecane dicarboxylic acid and higher homologs thereof. Adipic acid is particularly preferred.

A monomeric dicarboxylic acid anhydride, such as phthalic anhydride, may also be employed as the or as part of the non-dimeric acid component.

The polyester is preferably formed from dimer fatty acids to non-dimer acids present at a ratio in the range from 10 to 100:0 to 90%, more preferably 30 to 70:30 to 70%, particularly 40 to 60:40 to 60%, and especially 45 to 55:45 to 55% by weight of the total dicarboxylic acids.

The polyol component of the polyester used in the present invention suitably has a molecular weight in the range from 50 to 650, preferably 60 to 250, more preferably 70 to 200, and particularly 100 to 150. The polyol component may comprise polyols such as pentaerythritol, triols such as glycerol and trimethylolpropane, and preferably diols. Suitable diols include straight chain aliphatic diols such as ethylene glycol, diethylene glycol, 1,3-propylene glycol, dipropylene glycol, 1,4-butylene glycol, 1,6-hexylene glycol, branched diols such as neopentyl glycol, 3-methyl pentane glycol, 1,2-propylene glycol, and cyclic diols such as 1,4-bis(hydroxymethyl)cyclohexane and (1,4-cyclohexane-dimethanol). Diethylene glycol is a particularly preferred diol.

The polyol component may also comprise a dimer fatty diol. Dimer fatty acids are mentioned above in relation to the dicarboxylic acid component, and dimer fatty diols can be produced by hydrogenation of the corresponding dimer fatty acid. The same preferences above for the dimer fatty acid apply to the corresponding dimer fatty diol component of the polyester.

The polyester is preferably formed from dicarboxylic acid to diol starting materials at a molar ratio in the range from 1:1.0 to 5.0, more preferably 1:1.05 to 3.0, particularly 1:1.1 to 2.0, and especially 1:1.2 to 1.4. Thus, the diol is preferably present in molar excess so as to obtain a polyester terminated at both ends with OH groups.

In a preferred embodiment, the polyester is formed from dimer fatty acid, adipic acid, and diethylene glycol, preferably at a weight ratio in the range from 0.3 to 0.7:0.3 to 0.7:1.0 to 3.0, more preferably 0.4 to 0.6:0.4 to 0.6:1.1 to 2.0, particularly 0.45 to 0.55:0.45 to 0.55:1.2 to 1.4, and especially approximately 0.5:0.5:1.3.

The polyester preferably has a molecular weight number average in the range from 1,000 to 5,000, more preferably 1,700 to 3,000, particularly 1,800 to 2,500, and especially 1,900 to 2,200.

The polyester preferably has a glass transition temperature (Tg) value (measured as described herein) in the range from −60 to 0° C., more preferably −50 to −5° C., particularly −40 to −10° C., and especially −35 to −15° C.

The polyester preferably has a hydroxyl value (measured as described herein) in the range from 10 to 100, more preferably 30 to 80, particularly 40 to 70, and especially 50 to 60 mgKOH/g. In addition, the polyester preferably has an acid value (measured as described herein) of less than 2, more preferably less than 1.7, particularly less than 1.3, and especially less than 1.0.

The polyisocyanate component is preferably at least one isocyanate which has a functionality of at least 2, and may be an aliphatic isocyanate such as hexamethylene 1,6-diisocyanate, but more preferably is an aromatic isocyanate such as tolylene diisocyanate, m-phenylene diisocyanate, p-phenylene diisocyanate, xylylene diisocyanate, 4,4'-diphenylmethane diisocyanate, hexamethylene diisocyanate, isophorone diisocyanate, polymethylenepolyphenyl diisocyanate, 3,3'-dimethyl-4,4'-biphenylene diisocyanate, 3,3'-dimethyl-4,4'-diphenylmethane diisocyanate, 3,3-dichloro-4,4'-biphenylene diisocyanate, 1,5-naphthalene diisocyanate, or modified compounds thereof such as uretonimine-modified compounds thereof. The polyisocyanate monomers can be used alone or as mixtures thereof. In a preferred embodiment, 4,4'-diphenylmethane diisocyanate (MDI) is used alone, or more preferably a mixture of MDI and a uretonimine-modified 4,4'-diphenylmethane diisocyanate (modified MDI) is employed.

In one embodiment of the invention, at least one of the aforementioned polyisocyanates is reacted with at least one of the aforementioned polyesters, to form a prepolymer. The ratio of polyisocyanate to polyester starting materials which are mixed together to react to form the prepolymer is preferably in the range from 20 to 80:20 to 80%, more preferably 35 to 75:25 to 65%, particularly 45 to 70:30 to 55%, and especially 55 to 65:35 to 45% by weight. The polyisocyanate is preferably used in molar excess relative to OH group content of the polyester, so as to obtain a reaction mixture containing isocyanate-terminated prepolymer and sufficient unreacted polyisocyanate, such that later addition of the chain extender can result in reaction to form the polyurethane foam, without the requirement for adding further polyisocyanate.

The prepolymer reaction mixture preferably has an isocyanate content (measured as described herein) in the range from 5 to 30%, more preferably 15 to 23%, particularly 17 to 20%, and especially 18 to 19% NCO.

The chain extender component used to form the polyurethane suitably comprises a low molecular compound having 2 or more active hydrogen groups, for example polyols such as ethylene glycol, diethylene glycol, propylene glycol, 1,4-butylene glycol, 1,5-pentylene glycol, methylpentanediol, 1,6-hexylene glycol, neopentyl glycol, trimethylolpropane, hydroquinone ether alkoxylate, resorcinol ether alkoxylate, glycerol, pentaerythritol, diglycerol, and dextrose; aliphatic polyhydric amines such as ethylenediamine, hexamethylenediamine, and isophorone diamine; aromatic polyhydric amines such as methylene-bis(2-chloroaniline), methylenebis(dipropylaniline), diethyl-toluenediamine, trimethylene glycol di-p-aminobenzoate; alkanolamines such as diethanolamine, triethanolamine and diisopropanolamine.

In a preferred embodiment of the invention, the chain extender is a polyol, more preferably a diol, particularly having an aliphatic linear carbon chain comprising in the range from 1 to 10, and especially 3 to 5 carbon atoms. Preferred diols include ethylene glycol, propylene glycol, 1,4-butylene glycol, and 1,5-pentylene glycol. 1,4-butylene glycol is particularly preferred.

In a particularly preferred embodiment of the invention, at least one of the aforementioned polyesters is added together with the chain extender to react with the prepolymer in order to form the polyurethane. The molar ratio of chain extender to polyester employed is preferably in the range from 1 to 10:1, more preferably 1.5 to 8:1, particularly 2 to 5:1, and especially 2.5 to 4:1. The polyester employed may be the same as or different to the polyester used to form the prepolymer.

In one embodiment of the invention, non-dimer (acid or diol) containing polyester, may also be employed in forming the microcellular polyurethane foam, in addition to the dimer fatty (acid and/or diol) containing polyesters described herein. Suitable non-dimer containing materials include polyesters derived from adipic acid and common diols such as ethylene glycol, diethylene glycol, 1,4-butylene glycol, or specialty glycols and other special ingredients, eg caprolactone.

When the optional non-dimer containing polyester is present, the microcellular polyurethane foam is formed from dimer-containing polyester to non-dimer containing polyester (both used as the polyester and/or in isocyanate-terminated prepolymer form) preferably at a ratio in the range from 10 to 95:5 to 90, more preferably 30 to 90:10 to 70, particularly 40 to 80:20 to 60, and especially 50 to 70:30 to 50% by weight.

The dimer fatty acid and/or dimer fatty diol content of the polyurethane foam is preferably in the range from 5 to 50%, more preferably 8 to 40%, particularly 12 to 30%, and especially 15 to 20% by weight.

In the present invention, the chain extender composition may optionally contain other additives such as blowing agents, urethane promoting catalysts, surfactants, stabilizers and pigments.

Suitable blowing agents include water, and fluorocarbons such as trichlorofluoromethane, dichlorodifluoromethane and trichlorodifluoroethane. The blowing agents may be used alone or as mixtures thereof.

Examples of urethane catalysts include tertiary amines such as triethylamine, 1,4-diazabicyclo[2.2.2]octane (DABCO), N-methylmorpholine, N-ethylmorpholine, N,N,N',N'-tetramethylhexamethylenediamine, 1,2-dimethylimidazol; and tin compounds such as tin(II)acetate, tin(II)octanoate, tin(II)laurate, dibutyltin dilaurate, dibutyltin dimaleate, dioctyltin diacetate and dibutyltin dichloride. The catalysts may be used alone or as mixtures thereof.

Suitable surfactants include silicone surfactants such as dimethylpolysiloxane, polyoxyalkylene polyol-modified dimethylpolysiloxane and alkylene glycol-modified dimethylpolysiloxane; and anionic surfactants such as fatty acid salts, sulfuric acid ester salts, phosphoric acid ester salts and sulfonates.

Examples of the stabilizers include hindered phenol radical scavengers such as dibutylhydroxytoluene, pentaerythrityl-tetrakis[3-(3,5-di-t-butyl-4-hydroxyphenyl)propionate] and isooctyl-3-(3,5-di-t-butyl-4-hydroxyphenyl)propionate; antioxidants such as phosphorous acid compounds such as triphenylphosphite, triethylphosphite and triphenylphosphine; ultraviolet absorbing agents such as 2-(5-methyl-2-hydroxyphenyl)benzotriazole and a condensation product of methyl-3-[3-t-butyl-5-(2H-benzotriazole-2-yl)-4-hydroxyphenyl]propionate and polyethylene glycol. Suitable pigments include inorganic pigments such as transition metal salts; organic pigments such as azo compounds; and carbon powder.

The microcellular polyurethane foam according to the present invention may be produced by efficiently mixing the prepolymer with a chain extender composition, preferably in an injection moulding polyurethane machine. The chain extender composition is preferably prepared by simple pre-mixing of, for example, the chain extender, polyester and other additives (such as blowing agent, and/or urethane catalyst, and/or surfactant). In the polyurethane synthesis, the NCO/OH ratio employed is preferably in the range from 1 to 1.2:1, more preferably 1 to 1.1:1, and particularly 1 to 1.03:1.

The microcellular polyurethane foam according to the present invention is suitably defined as an elastomer of cellular structure containing mostly closed cells which are difficult to see with the naked eye (cell size of the order of approximately less than 0.1 mm). The foam preferably has a density (measured as described herein) in the range from 0.2 to 0.9, more preferably 0.25 to 0.7, particularly 0.3 to 0.6, and especially 0.35 to 0.5 gcm$^{-3}$.

The microcellular polyurethane foam preferably has a hardness (measured as described herein) in the range from 10 to 70, more preferably 20 to 60, particularly 25 to 55, and especially 30 to 50 Shore A.

The microcellular polyurethane foam suitably has a tensile strength (measured as described herein) of greater than 20, preferably greater than 30, more preferably in the range from 35 to 80, particularly 40 to 75, and especially 50 to 70 kgcm$^{-2}$.

The elongation at break (measured as described herein) of the microcellular polyurethane foam is suitably greater than 150%, preferably greater than 200%, more preferably greater than 250%, particularly in the range from 300 to 550% and especially 350 to 400%.

The tear strength (measured as described herein) of the microcellular polyurethane foam is preferably greater than 1.2, more preferably in the range from 1.6 to 6, particularly 2 to 5, and especially 2.5 to 4 kNm$^{-1}$.

The impact resilience (measured as described herein) of the microcellular polyurethane foam is suitably less than 45%, preferably in the range from 10 to 35%, more preferably 15 to 30%, particularly 18 to 27%, and especially 20 to 25%.

A particular advantage of the microcellular polyurethane foam according to the present invention is that it is resistant to hydrolysis. Thus, the foam after being subjected to hydrolysis for 2 weeks, as described under test procedures herein, suitably has a tensile strength and/or elongation at break, within the respective preferred values given above. The foam suitably retains at least 40%, preferably at least 60%, more preferably at least 80%, particularly at least 90%, and especially at least 100% of its initial tensile strength and/or initial elongation at break properties, after being subjected to hydrolysis for 2 weeks.

In addition, the microcellular polyurethane foam preferably retains at least 20%, more preferably at least 30%, particularly at least 40%, and especially at least 50% of its initial tensile strength properties, after being subjected to hydrolysis for 4 weeks. The foam preferably has a tensile strength of greater than 10, more preferably in the range from 15 to 45, particularly 20 to 40, and especially 25 to 35 kgcm$^{-2}$ after being subjected to hydrolysis for 4 weeks. The foam also suitably retains at least 30%, preferably at least 50%, more preferably at least 70%, particularly at least 85%, and especially at least 95% of its initial elongation at break properties after being subjected to hydrolysis for 4 weeks. The foam suitably has an elongation at break of greater than 100%, preferably greater than 150%, more preferably greater than 200%, particularly in the range from 250 to 450% and especially 300 to 400% after being subjected to hydrolysis for 4 weeks.

The microcellular polyurethane foam according to the present invention is suitable for use, inter alia, as shock absorbers/"spring aids" for automotive suspension, tyres (energy absorbing wheels for buggies, trollies) and technical parts (car seat components), and is particularly suitable for use in shoes. The foam can be used in dual density outsoles, single density boots, single density casual/formal, single density sandals, single density insoles, and especially in dual and single density midsoles.

The invention is illustrated by the following non-limiting examples.

In this specification the following test methods have been used.

(a) For Polyester and Prepolymer (i) The glass transition temperature (Tg) was measured by Differential Scanning Calorimetry (DSC) at a scan rate of 20° C./minute using a Mettler DSC30.

(ii) Molecular weight number average was determined by end group analysis.

(iii) The hydroxyl value is defined as the number of mg of potassium hydroxide equivalent to the hydroxyl content of 1 g of sample, and was measured by acetylation followed by hydrolysation of excess acetic anhydride. The acetic acid formed was subsequently titrated with an ethanolic potassium hydroxide solution.

(iv) The acid value is defined as the number of mg of potassium hydroxide required to neutralise the free fatty acids in 1 g of sample, and was measured by direct titration with a standard potassium hydroxide solution.

(v) The isocyanate value is defined as the weight % content of isocyanate in the sample and was determined by reacting with excess dibutylamine, and back titrating with hydrochloric acid.

(b) For Microcellular Polyurethane Foam (i) Density

Determined by measuring the mass and volume of the specimen (to within 1% accuracy) and calculating density (=mass/volume).

(ii) Hardness

Measured using a Shore A meter on a 10 mm thick sample. Mean value of 10 readings calculated.

(iii) Tensile Strength

Determined according to ISO 37/DIN 53504 using a Z82B29 sample die.

(iv) Elongation at Break

Measured according to ISO 37/DIN 53504 using a Z82B29 sample die.

(v) Tear Strength

Determined using a procedure analogous to ASTM D3574 test F, except that the sample used was 100×25×10 mm with a 40 mm cut in the centre of the 25×10 mm face, parallel to the 25×100 mm face. The crosshead speed was 200 mm/min. The maximum load from the start of tearing over a 20 mm tear was recorded, and the tear strength calculated by dividing by the thickness (25 mm).

(vi) Impact Resilience

Measured according to ASTM D3574 (falling ball rebound test).

(vii) Hydrolysis

Samples were aged by placing dumbells of the material in a climate chamber at 70° C. and >98% relative humidity for periods of 2 and 4 weeks. The tensile strength and elongation at break of the "aged" samples were determined as above and the values compared to the original figures (on percentage retention terms).

All the above tests were performed after the foam samples had been conditioned for a minimum of 24 hours, undeflected and undistorted at 23° C. and 50% relative humidity.

EXAMPLES

Example I (a) 902 g of adipic acid, 902 g of PRIPOL 1017 (trade mark, ex Uniqema (dimer acid)) and 1051 g of diethylene glycol were reacted at 225° C. in the presence of 50 ppm of tetrabutyl titanate catalyst. On completion of the reaction, the excess diethylene glycol was removed in vacuo and the dimerate polyester product was purified by filtration. Hydroxyl value was found by titration to be 54 mg KOH/g.

(b) 586 g of the polyester produced above was placed in a flask and dried by heating for 2 hours at 120° C. and 50 mbar. 860 g of flake pure MDI (ex Bayer) was added at a temperature of 50 to 60° C. over 1 hour period at atmospheric pressure. 161 g of modified MDI (Suprasec 2021, ex Huntsman Polyurethanes) was then added, and the reaction was heated at 55° C. for a further hour, and then at 85° C. for a further two hours. The product was discharged and stored at 50° C. The prepolymer material was found to have an isocyanate content of 18.5% NCO.

(c) A chain extender composition was prepared by mixing the following components in the following ratio:

| | |
|---|---|
| Polyester prepared in (a) | 100 |
| DABCO DC193 silicone surfactant (ex Air Products) | 0.4 |
| 1,4-butylene glycol (dry) | 12 |
| DABCO crystal (triethylene diamine, ex Air Products) | 0.5 |
| Distilled water | 0.5 |

(d) The prepolymer (prepared in (b)) and the chain extender composition (prepared in (c)) were mixed using an injection moulding polyurethane machine, with an isocyanate index of 100 to 103, and a mixing temperature of 35 to 45° C. The cream time was 5 to 10 seconds. The mould was coated in silicone release agent and was at a temperature of 65° C. A polyurethane foam sheet of 150×150 mm was yielded (step mould resulted in 4 mm thick and 10 mm thick sections). The foam was demoulded after 8 minutes.

The resulting polyurethane foam had the following properties, measured as described above;
(i) The density (of 10 mm thick section) was 0.37 gcm$^{-2}$,
(ii) The hardness was 35 Shore A,
(iii) The tensile strength was 33.9 kgcm$^{-2}$ (the modulus at 100% was 15 kgcm$^{-2}$),
(iv) The elongation at break was 300%, and
(v) The tear strength was 2.2 kNm$^{-1}$.

The polyurethane foam was subjected to hydrolysis conditions for 2 weeks and 4 weeks as described above, and the following properties were remeasured;
Two weeks—
(i) The tensile strength was 30.9 kgcm$^{-2}$ (=91% retention of initial value), and
(ii) The elongation at break was 253% (=84% retention of initial value).
Four weeks—
(i) The tensile strength was 14.6 kgcm$^{-2}$ (=43% retention of initial value), and
(ii) The elongation at break was 122% (=41% retention of initial value).

Example 2

(a) The procedure according to Example 1(a) was used except that the starting materials were 879 g of adipic acid, 879 g of dimer acid (containing 88% by weight dimer and 10% by weight trimer) were reacted with 1042 g of diethylene glycol. Hydroxyl value of the resultant polyester was 54 mg KOH/g.

(b) The procedure according to Example 1(b) was employed except that 706 g of the polyester produced above was reacted with 960 g of flake pure MDI (ex Bayer) and 185 g of modified MDI (Desmodur CD, ex Bayer). The prepolymer material had an isocyanate content of 18.5% NCO.

(c) The procedure according to Example 1(c) was employed except that polyester produced in Example 2(a) above was used.

(d) The procedure according to Example 1(d) was employed except that materials produced in Example 2(b) and (c) above were used.

The resulting polyurethane foam had the following properties, measured as described above;
(i) The density (of 10 mm thick section) was 0.48 gcm$^{-2}$,
(ii) The hardness was 46 Shore A,
(iii) The tensile strength was 74 kgcm$^{-2}$ (the modulus at 100% was 27 kgcm$^{-2}$),
(iv) The elongation at break was 341%,
(v) The tear strength was 2.5 kNm$^{-1}$, and
(vi) The impact resilience was 25%.

The polyurethane foam was subjected to hydrolysis conditions for 2 weeks and 4 weeks as described above, and the following properties were remeasured;
Two weeks—
(i) The tensile strength was 70 kgcm$^{-2}$ (=95% retention of initial value), and
(ii) The elongation at break was 397% (=16% increase over initial value).
Four weeks—
(i) The tensile strength was 33 kgcm$^{-2}$ (=45% retention of initial value), and
(ii) The elongation at break was 339% (=99% retention of initial value).

Example 3

This is a comparative example not according to the invention. The procedure according to Example 1 was repeated except that Daltorez P716 (adipate polyester, ex Huntsman Polyurethanes) was used as polyester, and Suprasec 2980 (polyester modified MDI, ex Huntsman Polyurethanes) was used as the as prepolymer.

The resulting adipate derived polyurethane foam had the following properties, measured as described above;
(i) The density (of 10 mm thick section) was 0.42 gcm$^{-2}$,
(ii) The hardness was 38 Shore A,
(iii) The tensile strength was 60 kgcm$^{-2}$ (the modulus at 100% was 16 kgcm$^{-2}$),
(iv) The elongation at break was 516%,
(v) The tear strength was 4.1 kNm$^{-1}$, and
(vi) The impact resilience was 37%.

The polyurethane foam was subjected to hydrolysis conditions for 2 weeks and 4 weeks as described above, and the following properties were remeasured;
Two weeks—
(i) The tensile strength was 11 kgcm$^{-2}$ (=18% retention of initial value), and
(ii) The elongation at break was 104% (=20% retention of initial value).
Four weeks—
(i) The tensile strength was 0 kgcm$^{-2}$ (=0% retention of initial value), and
(ii) The elongation at break was 0% (=0% retention of initial value).

Example 4

This is a comparative example not according to the invention. The procedure according to Example 1 was repeated except that the starting materials were adipate polyester (Desmophen 2000 MZ, ex Bayer (468 g)), flake pure MDI (ex Bayer (640.4 g)) and modified MDI (Suprasec 2021, ex Huntsman Polyurethanes (123.1 g)).

The resulting adipate derived polyurethane foam was subjected to hydrolysis conditions for 4 weeks as described above, and the following properties were measured;
(i) The tensile strength was 6 kgcm$^{-2}$, and
(ii) The elongation at break was 42%.

The above examples illustrate the improved properties of a microcellular polyurethane foam according to the present invention.

The invention claimed is:

1. A microcellular polyurethane foam, obtained by reacting:
   i) an isocyanate-terminated prepolymer obtained by reacting a polyisocyanate with a first polyester, which is formed from:
      a) a dimer fatty acid; and/or
      b) a dimer fatty diol;
   ii) a second polyester, which is formed from:
      a) a dimer fatty acid; and/or
      b) a dimer fatty diol; and
   iii) a chain extender;
wherein:
   i) said first and second polyesters may be the same or different;
   ii) said foam retains at least 80% of its initial tensile strength after being subjected to hydrolysis for 2 weeks; and
   iii) the molar ratio of the chain extender to second polyester reacting to form the microcellular polyurethane foam is in the range from 1 to 10:1.

2. The foam of claim 1, wherein the foam retains at least 90% of its initial tensile strength properties after being subjected to hydrolysis for 2 weeks.

3. The foam of claim 1, wherein the foam retains at least 30% of its initial tensile strength properties after being subjected to hydrolysis for 4 weeks.

4. The foam of claim 3, wherein the foam retains at least 40% of its initial tensile strength properties after being subjected to hydrolysis for 4 weeks.

5. The foam of claim 1, wherein the foam retains at least 60% of its initial elongation at break properties after being subjected to hydrolysis for 2 weeks.

6. The foam of claim 1, wherein the foam comprises:
   i) a density in the range from 0.35 to 0.9 gcm$^{-3}$;
   ii) a tensile strength greater than 30 kgcm$^{-2}$;
   iii) an elongation at break of greater than 200%;
   iv) a tear strength greater than 1.2 kNm$^{-1}$; and/or
   v) an impact resilience less than 45%.

7. The foam of claim 1, wherein the dimer fatty acids and/or dimer fatty diols of each of said first and second polyesters have a trimer content of 2 to 15% by weight.

8. The foam of claim 1, wherein the dimer fatty acids and/or dimer fatty diols of each of said first and second polyesters have a trimer content of 5 to 15% by weight.

9. The foam of claim 1, wherein each of said first and second polyesters is additionally formed from a non-dimer dicarboxylic acid.

10. The foam of claim 9, wherein the non-dimer dicarboxylic acid comprises adipic acid.

11. The foam of claim 1, wherein the chain extender is a diol having an aliphatic linear carbon chain comprising 1 to 10 carbon atoms.

12. The foam of claim 1, wherein the foam comprises:
   i) a hardness in the range from 20 to 60 Shore A;
   ii) a tensile strength in the range from 35 to 80 kgcm$^{-2}$;
   iii) an elongation at break of greater than 250%;
   iv) a tear strength in the range from 2 to 8 kNm$^{-1}$; and/or
   v) an impact resilience in the range from 10 to 35%.

13. The foam of claim 1, wherein the first polyester and/or second polyesters are obtained from the reaction consisting of:
   i) dimer fatty acid;
   ii) adipic acid; and
   iii) diethylene glycol.

14. The foam of claim 1, wherein the first polyester is obtained from the reaction product of a reaction consisting of:
   a) dimer fatty acid;
   b) adipic acid; and
   c) diethylene glycol;
wherein
   the ratio of dimer fatty acid, adipic acid, and diethylene glycol is in the range of 0.3 to 0.7:0.3 to 0.7:1.0 to 3.0 by weight.

15. A process for forming a microcellular polyurethane foam, obtained by reacting:
   an isocyanate-terminated prepolymer obtained by reacting a polyisocyanate with a first polyester, which is formed from:
      a) a dimer fatty acid; and/or
      b) a dimer fatty diol;
   a second polyester, which is formed from:
      a) a dimer fatty acid; and/or
      b) a dimer fatty diol; and
   iii) a chain extender;
wherein:
   i) said first and second polyesters may be the same or different; and
   ii) said foam retains at least 80% of its initial tensile strength after being subjected to hydrolysis for 2 weeks.

16. A shoe sole comprising a microcellular polyurethane foam, obtained by reacting:
   i) an isocyanate-terminated prepolymer obtained by reacting a polyisocyanate with a first polyester, which is formed from:
      a) a dimer fatty acid; and/or
      b) a dimer fatty diol;
   ii) a second polyester, which is formed from:
      a) a dimer fatty acid; and/or
      b) a dimer fatty diol; and
   iii) a chain extender;
wherein:
   i) said first and second polyesters may be the same or different; and
   ii) said foam retains at least 80% of its initial tensile strength after being subjected to hydrolysis for 2 weeks.

* * * * *